US 8,209,561 B2

(12) United States Patent
Shirotori et al.

(10) Patent No.: US 8,209,561 B2
(45) Date of Patent: Jun. 26, 2012

(54) REAL TIME CLOCK AND METHOD FOR RECORDING DATA IN REAL TIME CLOCK

(75) Inventors: Toru Shirotori, Minamiminowa-mura (JP); Toshiya Usuda, Minamiminowa-mura (JP)

(73) Assignee: Seiko Epson Corporation, Tokyo (JP)

( * ) Notice: Subject to any disclaimer, the term of this patent is extended or adjusted under 35 U.S.C. 154(b) by 1013 days.

(21) Appl. No.: 12/175,099

(22) Filed: Jul. 17, 2008

(65) Prior Publication Data

US 2009/0022013 A1   Jan. 22, 2009

(30) Foreign Application Priority Data

Jul. 20, 2007  (JP) ................................. 2007-189145
Jun. 3, 2008   (JP) ................................. 2008-145530

(51) Int. Cl.
*G06F 1/00* (2006.01)

(52) U.S. Cl. ............ 713/500; 713/502; 714/48; 714/55; 714/723

(58) Field of Classification Search .................. 713/500, 713/502; 714/48, 55, 723
See application file for complete search history.

(56) References Cited

U.S. PATENT DOCUMENTS

| | | | | |
|---|---|---|---|---|
| 6,357,007 | B1 * | 3/2002 | Cromer et al. | 713/194 |
| 6,871,291 | B2 * | 3/2005 | Chan et al. | 713/340 |
| 6,985,811 | B2 * | 1/2006 | Gronemeyer | 701/213 |
| 7,649,422 | B2 * | 1/2010 | Chen et al. | 331/34 |
| 7,716,512 | B1 * | 5/2010 | Schaffstein et al. | 713/500 |
| 7,855,581 | B2 * | 12/2010 | Priel et al. | 327/20 |
| 7,855,584 | B2 * | 12/2010 | Easwaran | 327/158 |
| 2004/0225439 | A1 * | 11/2004 | Gronemeyer | 701/213 |
| 2006/0195260 | A1 * | 8/2006 | Gronemeyer | 701/213 |
| 2008/0169970 | A1 * | 7/2008 | Woodcox et al. | 342/113 |
| 2008/0246549 | A1 * | 10/2008 | Chen et al. | 331/185 |

FOREIGN PATENT DOCUMENTS

JP   A-2003-132470   5/2003

\* cited by examiner

*Primary Examiner* — Thomas Lee
*Assistant Examiner* — Jaweed A Abbaszadeh
(74) *Attorney, Agent, or Firm* — Oliff & Berridge, PLC

(57) ABSTRACT

A real time clock for outputting data indicating a time of day includes: an event detection circuit for detecting that an event detection signal has been inputted from outside; a timing circuit for generating the time-of-day data according to a signal outputted from an oscillator circuit; a memory; and a control circuit for, if the event detection circuit detects input of the event detection signal, recording event data in the memory, the event data including additional data indicating an operating state of the real time clock and the time-of-day data generated by the timing circuit.

8 Claims, 5 Drawing Sheets

REAL TIME CLOCK AND METHOD FOR RECORDING DATA IN REAL TIME CLOCK

BACKGROUND

1. Technical Field

The present invention relates to a real time clock and a method for recording data in a real time clock.

2. Related Art

A real time clock is known as an apparatus for recording information indicating the time-of-day of occurrence of an event in a built-in memory and is disclosed, for example, in JP-A-2003-132470. The real time clock disclosed in JP-A-2003-132470 includes an oscillator circuit, a frequency dividing circuit, a timing circuit, an interface circuit, an operation control circuit, an event detection circuit, and an event storage memory. In the real time clock thus configured, the event storage memory stores data including information indicating the time of day of occurrence of an event detected by the event detection circuit and information specific to the event, as one piece of event data.

By using the real time clock configured as described above, a user is allowed to identify an event that has occurred at a recorded time-of-day, on the basis of event information stored in the event storage memory. While JP-A-2003-132470 discloses that the real time clock includes, as power supply systems, a so-called "main power supply" that provides power from a wall outlet and a backup power supply that provides power from a primary or secondary cell, it has no countermeasures against an unexpected situation such as a voltage reduction or an oscillation stop. Therefore, if erroneous data is written into the event storage memory due to a voltage reduction or the like, the real time clock cannot make a determination about the correctness of the stored data cannot be determined. As a result, the reliability of stored specific event data is low.

SUMMARY

An advantage of the invention is to provide a real time clock that improves (makes a determination about the reliability) the reliability of stored event data, and a method for recording data in a real time clock.

According to a first aspect of the invention, a real time clock for outputting data indicating a time of day includes: an event detection circuit for detecting that an event detection signal has been inputted from outside; a timing circuit for generating the time-of-day data according to a signal outputted from an oscillator circuit; a memory; and a control circuit for, if the event detection circuit detects input of the event detection signal, recording event data in the memory, the event data including additional data indicating an operating state of the real time clock and the time-of-day data generated by the timing circuit.

According to the real time clock thus configured, a user is allowed to know the operating state of the real time clock at the time when the event data has been recorded. As a result, the reliability of the event data is improved.

The real time clock according to the first aspect of the invention preferably further includes a voltage reduction detection circuit for detecting a reduction in a power supply voltage applied to a power supply terminal. The additional data preferably includes voltage reduction information indicating a reduction in the power supply voltage detected by the voltage reduction detection circuit.

According to the real time clock thus configured, the reliability of the event data is improved, Also, the user is allowed to know changes of the voltage of a current provided to the real time clock.

In the real time clock according to the first aspect of the invention, the voltage reduction detection circuit preferably includes a first voltage comparison unit for detecting that the power supply voltage is lower than a first threshold. The voltage reduction information preferably includes information indicating whether, when the event detection circuit detects input of the event detection signal, the first voltage comparison unit of the voltage reduction detection circuit has detected that the power supply voltage is lower than the first threshold.

According to the real time clock thus configured, the user is allowed to know the operating state of the real time clock according to the setting of the threshold.

In the real time clock according to the first aspect of the invention, the voltage reduction detection circuit preferably further includes a second voltage comparison unit for detecting that the power supply voltage is lower than a second threshold, the second threshold being set to a value lower than the first threshold. The voltage reduction information preferably includes information indicating whether the second voltage comparison unit of the voltage reduction detection circuit has detected that the power supply voltage is lower than the second threshold.

According to the real time clock thus configured, the accuracy of an analysis to be performed when a system error or the like has occurred will be improved.

The real time clock according to the first aspect of the invention preferably further includes an oscillation stop detection circuit for detecting that the oscillator circuit has stopped oscillating. The additional data preferably includes oscillation stop information indicating whether the oscillation stop detection circuit has detected the oscillation stop.

According to the real time clock thus configured, even if the oscillator has stopped oscillating for reasons other than a reduction in the power supply voltage, the oscillation stop is detected. This allows determining the correctness of the event data recorded in the memory, specifically, the correctness of the time-of-day data added to the event data. As a result, the reliability of the event data is improved.

The real time clock according to the first aspect of the invention preferably further includes a setting register in which any one of rising edge detection mode and falling edge detection mode is settable. In the rising edge detection mode, a rising edge of a voltage waveform of the event detection signal is detected, and in the falling edge detection mode, a falling edge of the voltage waveform of the event detection signal is detected. The additional data preferably includes detection information indicating which of the rising edge detection mode and the falling edge detection mode has previously been set in the setting register when the event detection circuit detects input of the event detection signal.

According to the real time clock thus configured, events that occur in various external apparatuses are detected. For example, in the case of an object that performs a pair of operations, assignments such as "closed to open: rising edge signal" and "open to closed: falling edge signal" are made. This allows selective detection of any one of the operations. If multiple terminals are provided, both an opening operation and a closing operation are detected.

The real time clock according to the first aspect of the invention preferably further includes a plurality of terminals for receiving the event detection signal. If the event detection circuit detects input of the event detection signal, the control circuit preferably records the event data in the memory, the event data including the additional data, the time-of-day data, and a port number of one of the terminals, the one of the terminals having received the event detection signal.

According to the real time clock thus configured, signals corresponding to different event occurrences are inputted into the input terminals and then recorded, and a port number of each terminal is added to corresponding additional information. As a result, the user is allowed to know which event has occurred at which terminal.

According to a second aspect of the invention, a method for recording data in a real time clock having a function of recording data indicating the time of day of occurrence of an event in a memory includes recording, as event data, data including the time-of-day data and additional data, the additional data including a determination about an operating state of the real time clock at the time of occurrence of the event.

According to the real time clock thus configured, the reliability of event data is improved.

In the method for recording data in a real time clock according to the second aspect of the invention, the additional data preferably includes information indicating a determination whether a power supply voltage applied to a power supply terminal is lower than a threshold.

Since the additional information includes determination information as described above, the user is allowed to know the operating state of the real time clock from the determination information according to the setting of the threshold.

In the method for recording data in a real time clock according to the second aspect of the invention, the additional data preferably includes information indicating a determination within which of a plurality of voltage ranges the applied voltage falls.

Since the additional information includes determination information as described above, the user is allowed to know the operating state of the real time clock in greater detail according to such determination information. As a result, the reliability of the recorded event data is improved.

In the method for recording data in a real time clock according to the second aspect of the invention, the additional data preferably includes information indicating whether a stop of oscillation of an oscillator circuit of the real time clock has been detected.

Since the additional information includes information as described above, even if the oscillator has stopped oscillating for reasons other than an increase or a reduction in the power supply voltage, the oscillation stop is detected. As a result, the reliability of the recorded event data is improved.

BRIEF DESCRIPTION OF THE DRAWINGS

The invention will be described with reference to the accompanying drawings, wherein like numbers reference like elements.

DESCRIPTION OF EXEMPLARY EMBODIMENTS

Real time clocks according to embodiments of the invention will now be described in detail with reference to the accompanying drawings. First, a real time clock according to a first embodiment of the invention will be described with reference to FIG. 1.

Figure 1:
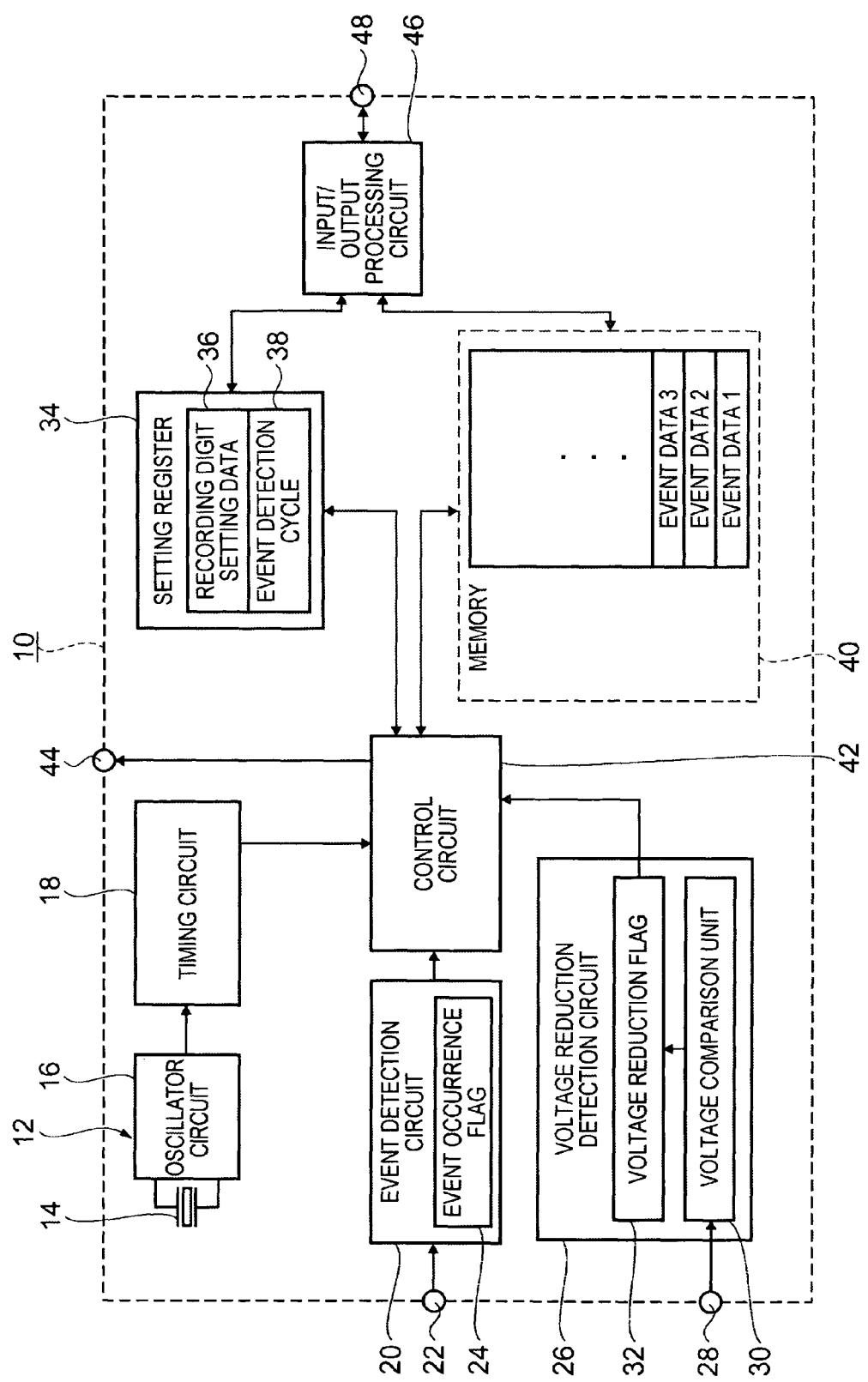
FIG. 1 is a block diagram showing a configuration of a real time clock according to a first embodiment of the invention.

As shown in FIG. 1, a real time clock 10 according to this embodiment basically includes an oscillator 12, a timing circuit 18, an event detection circuit 20, a voltage reduction detection circuit 26, a setting register 34, a memory 40, a control circuit 42, and an input/output processing circuit 46.

The oscillator 12 includes a vibrator 14 and an oscillator circuit 16. The vibrator 14 receives an electric signal via the oscillator circuit 16 so as to vibrate at a predetermined frequency. Then, the oscillator circuit 16 amplifies the electric signal outputted from the vibrator 14 and then outputs the signal. While the material of the vibrator 14 is not limited to any particular one, a material having a good frequency-temperature characteristic is preferably used to obtain a stable oscillation frequency in a wide temperature range. For example, if a piezoelectric vibrator is used as the vibrator 14, a vibrator piece thereof is preferably formed of quartz crystal.

The oscillator 12 is coupled to the timing circuit 18. The timing circuit 18 divides the signal outputted from the oscillator 12 to obtain a signal with a frequency of 1 Hz, and counts the year, month, date, hour, minute, and second in corresponding timing registers (not shown) using the signal with a frequency of 1 Hz. The timing circuit 18 thus configured allows obtaining time-of-day data, thus allowing recording the date/time or the like of occurrence of an event (in each event detection period) in the memory. Depending on a setting, the timing circuit 18 also allows storing day-of-week data as well as the above-described year, month, date, hour, minute, and second in the memory.

The even detection circuit 20 is coupled to an event input terminal 22 that is an outside terminal of the real time clock 10. When the event input terminal 22 receives an electric signal indicating that an event has occurred, the event detection circuit 20 sets an event occurrence flag. Such indication of occurrence of an event using a flag allows determining whether an event has occurred, according to the flag. Specifically, the event detection circuit 20 sets the event occurrence flag to 1 (changes from 0 to 1).

The voltage reduction detection circuit 26 is coupled to a power supply terminal 28 that is an outside terminal of the real time clock 10. The voltage reduction detection circuit 26 includes a voltage comparison unit 30. A reference current voltage is previously set in the voltage comparison unit 30. The voltage (applied voltage) of a current inputted to the power supply terminal 28 and the reference voltage are compared in the voltage comparison unit 30. If the voltage comparison unit 30 determines that the inputted voltage is lower than the reference voltage, the voltage reduction detection unit 26 sets a voltage reduction flag 32. Specifically, if the voltage of a current inputted to the power supply terminal 28 has become lower than the reference voltage, the voltage reduction detection unit 26 sets the voltage reduction flag 32 to 1 (changes from 0 to 1). For example, the reference voltage may be set to the order of 1.2 V.

The setting register 34 stores recording digit setting data 36 and an event detection period 38. When the control circuit 42, which will be described in detail later, records a time-of-day in the memory 40, it provides a data area of one byte (eight bits) for each of the year, month, date, hour, minute, and second, and arranges the year, month, date, hour, minute, and second in series in the data areas using binary coded decimal (BCD) in pack format. The maximum value of a number shown as time-of-day data is "99" in the unit of "year." If this number is represented by 8-bit binary numbers, "10011001" will result.

The recording digit setting data 36 determines the number of digits of data (data obtained by combining time-of-day data and additional data) that makes up event data to be described later. If the year, month, date, hour, minute and second, which are time-of-day data, are each shown using one byte, six bytes (48 digits) are required. A value obtained by adding one byte (eight digits) or two bytes (16 digits) to the time-of-day data is preferably set as event data. The event detection period 38 is a cycle in which it is checked whether the event detection circuit 20 has detected an event (whether the event occurrence flag 24 has been set). The recording digit setting data 36 and event detection period 38 may be settable by a user after the real time clock 10 is shipped. In this case, data is preferably written via an outside terminal of the real time clock 10.

The memory 40 is a storage means for recording the above-described time-of-day data and data on the occurrence of an event, and data on a voltage reduction. Event data formed by the control circuit 42, which will be described in detail later, is recorded in an area allocated to a write address.

Coupled to the control circuit 42 are the above-described timing circuit 18, event detection circuit 20, voltage reduction detection circuit 26, setting register 34, memory 40, and an interrupt output terminal 44, which is an outside terminal. The control circuit 42 is allowed to read, from the timing circuit 18, data indicating the time-of-day when the setting of a flag has been detected, on the basis of flag information inputted by the event detection circuit 20 or voltage reduction detection circuit 26. The control circuit 42 connects various types of information detected by the event detection circuit 20 and voltage reduction detection circuit 26 as additional data, to the front part (top) of data indicating the time of day of occurrence of an event. Here, eight-bit data making up the additional data is preferably data whose top two digits start with "11," that is, preferably represented in the form of "11XXXXXX." As described above, the maximum value of eight-bit data making up the time-of-day data is data starting with "10"; therefore, addition of data starting with "11" to the top of the time-of-day data makes it easy to distinguish the additional data from the time-of-day data. Even if the user reads multiple pieces of event data collectively and if the pieces of data are displayed consecutively, the front part ("11") of each additional data serves as the header of the corresponding event data; therefore, representation of data in such a form allows easily identifying the boundaries between the pieces of event data. If a piece of data (information indicating a determination about an applied voltage) about a voltage reduction and a piece of data about the occurrence of an event are each represented by data of one byte, it is preferable to use the first two digits of the first four bits as a header, use any one of the following two digits to represent voltage reduction data, and use the last four bits to represent data specific to the event. That is, it is preferable to represent data in the form of "11 (header) 01 (voltage reduction data) XXXX (event-specific data)."

When an arbitrary event is inputted, the interrupt output terminal 44 records time-of-day data, data about the occurrence of the event, and data about a voltage reduction, as well as outputs a signal to a central processing unit (CPU) in an interruptive-manner.

The input/output processing circuit 46 serves as an input/output interface. It is coupled to the setting register 34 and memory 42, as well as coupled to the data input/output terminal 48 that is an outside terminal of the real time clock 10. The input/output processing circuit 46 outputs write data inputted via the data input/output terminal 48 to the setting register 34 or memory 40 or reads event data recorded in the memory 40.

Figure 2:
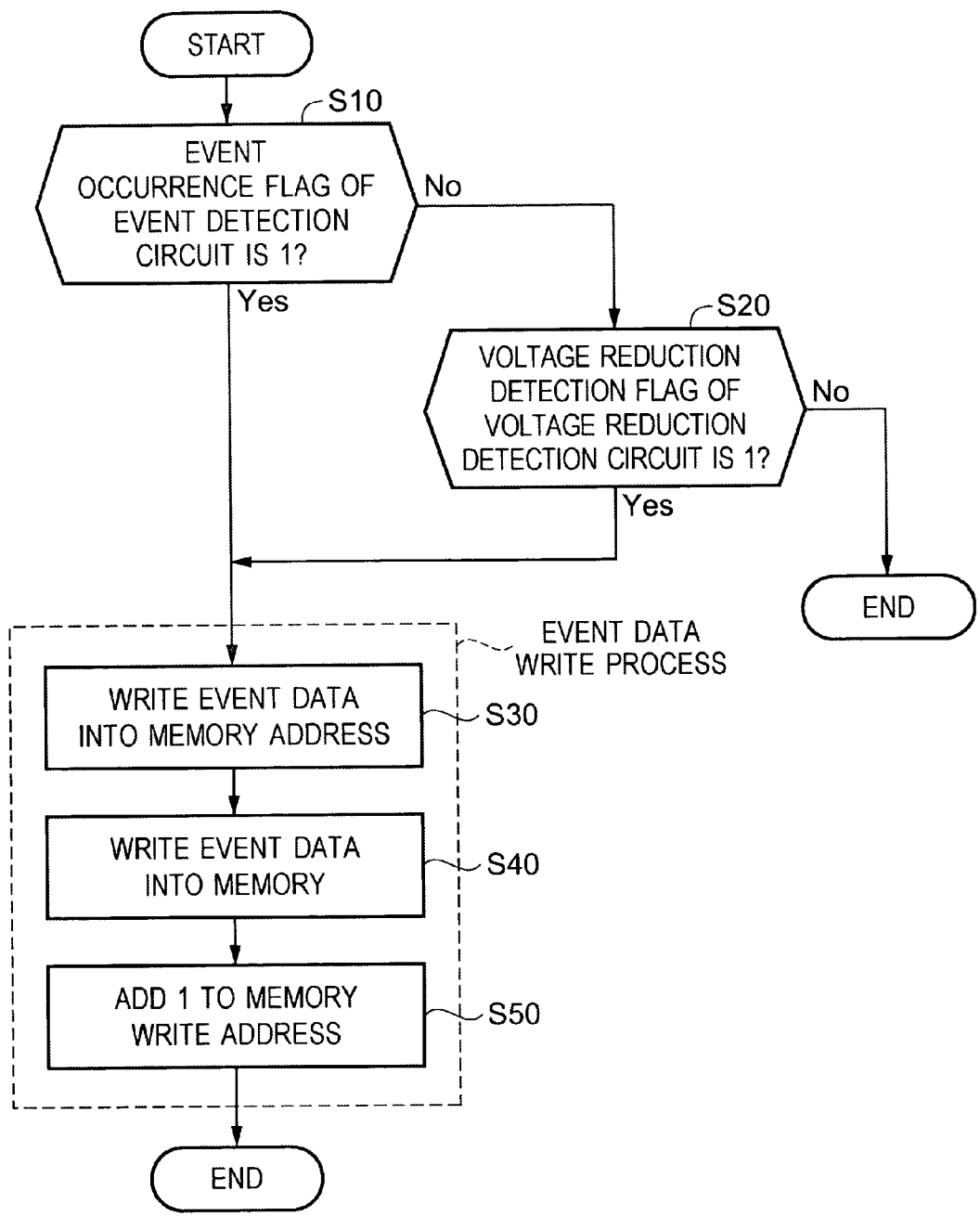
FIG. 2 is a flowchart showing the flow of operations of the real time clock.

Hereafter, operations of the real time clock 10 configured as described above will be described with reference to FIG. 2. First, an electric signal indicating that an event has occurred (e.g., ON/OFF of a switch, etc.) from an event occurrence device (now shown) is inputted into the event input terminal 22. Then, the event detection circuit 20 detects the signal and sets the event occurrence flag 24. Specifically, as described above, the even detection circuit 20 changes the event occurrence flag 24 from "0," which shows that no electric signal based on the occurrence of an event has been detected, to "1," which shows that an electric signal based on the occurrence of an event has been detected.

On the other hand, the voltage of a current inputted into the power supply terminal 28 is compared with the reference voltage in the voltage comparison unit 30 of the voltage reduction detection circuit 26. If the voltage comparison unit 30 determines that the applied voltage is Lower than the reference voltage, the voltage reduction detection circuit 26 sets the voltage reduction flag 32. Specifically, as described above, the voltage reduction detection circuit 26 changes the voltage reduction flag 32 from "0," which shows that the applied voltage is equal to or higher than the reference voltage, to "1," which shows that the applied voltage is lower than the reference voltage.

The control circuit 42 receives the event detection period 38 from the setting register 34; therefore, it determines whether the event detection circuit 20 has detected the occurrence of an event, according to this period (S10). If the event occurrence flag 24 set by the event detection circuit 20 is "0," the control circuit 42 determines that the occurrence of an event has not been detected (NO in S10). In this case, in order to determine the correctness of the determination, the control circuit 42 determines whether a reduction in the applied voltage has been detected (S20). If no reduction in the applied voltage has been detected (NO in S20), the control circuit 40 terminates the process without writing any event data and waits until a subsequent event detection period 38 comes along.

On the other hand, if a reduction in the applied voltage is detected in S20 (YES in S20), the control circuit 42 writes event data including additional data indicating the occurrence of the voltage reduction, into the memory.

Also, if it is determined in S10 that the occurrence of an event has been detected (YES in S10), the control circuit 42 writes event data into the memory, regardless of whether no reduction in the applied voltage has been detected or a reduction in the applied voltage has been detected. This is because the determination whether a reduction in the applied voltage has been detected is made to determine the correctness of the determination whether the occurrence of an event has been detected.

Before the control circuit 42 writes event data into the memory, it reads the current time of day stored in the timing circuit 18. Then, the control circuit 42 forms event data by connecting the additional data indicating the occurrence of the event as well as the reduction in the voltage to the timeof-day data, and then writes the event data into the memory. The event data is written as follows: first, the event data is written into an address of the memory 40 (S30); then the event data is written into a data recording area of the memory 40 (S40); and then "1" is added to the write address of the memory 40 (S50). Note that event information may be written into the memory 40 one after another from a lower memory address to a higher memory address or from a higher memory address to a lower memory address. If event information is written one after another from a higher memory address to a lower memory address, "1" is subtracted from each of the write addresses.

After "1" is added to the write address of the memory 40, the control circuit 42 terminates the writing process of the event information into the memory 40 and will be kept on standby until a subsequent event detection period 38 comes along.

The real time clock 10 thus configured is allowed to detect a reduction in the applied voltage each time an event detection period 38 comes along. In a related-art example, if the voltage (applied voltage) of an inputted current is reduced, the reliability of information (event occurrence flag 24) recorded in a register (not shown) of the event detection circuit 20 is reduced; however, the real time clock 10 configured as described above is allowed to improve the reliability of a determination about the correctness of the determination whether an event has occurred.

Also, according to the real time clock 10 configured as described above, the additional data is recorded in the memory 40 together with the time-of-day data, As a result, the user is also allowed to obtain information other than the data indicating the time-of-day of the occurrence of the event. For example, if data specific to an event is recorded as additional data, the user is allowed to identity the type of the event.

Also, according to the real time clock 10 configured as described above, information indicating that a reduction in the applied voltage has been detected is recorded as one event. This allows knowing until when the power was normally provided to the real time clock 10, thus drastically improving the accuracy of an analysis to be performed when a system error has occurred.

If a piezoelectric vibrator is used as the vibrator 14 and if a vibration piece thereof is made of quartz crystal, the time-of-day when event data is recorded becomes more accurate. As a result, the event is recorded with a higher resolution.

Figure 3:
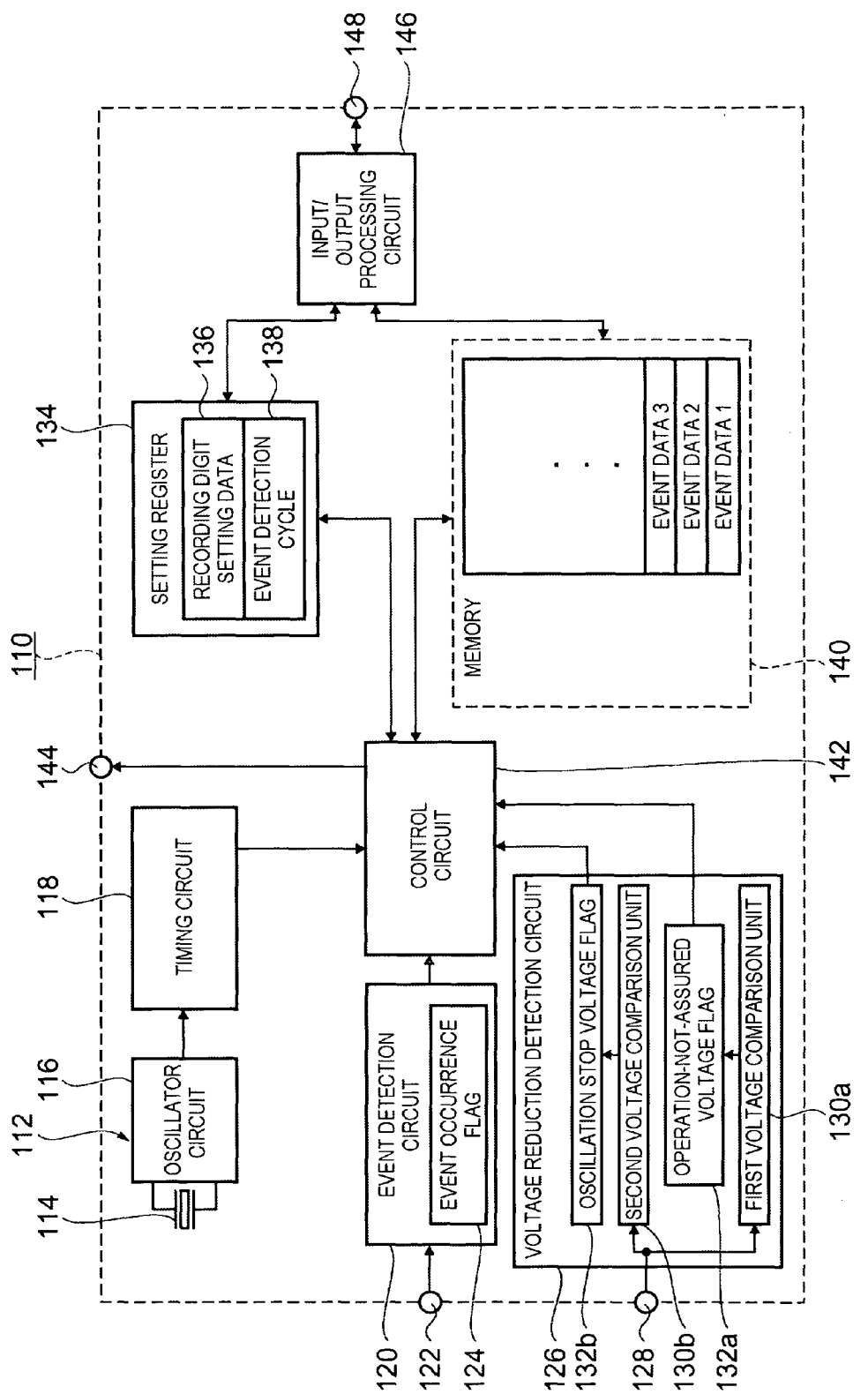
FIG. 3 is a block diagram showing a configuration of a real time clock according to a second embodiment of the invention.

Next, a real time clock according to a second embodiment of the invention will be described with reference to FIG. 3. The configuration of the real time clock according to this embodiment is almost the same as that of the above-described real time clock 10 according to the first embodiment. Therefore, in FIG. 3, components having the same functions as those in the first embodiment are given reference numerals obtained by adding 100 to those in the first embodiment and will not be described. A real time clock 110 according to this embodiment is different from the real time clock 10 according to the first embodiment in that a voltage is detected at multiple levels (voltage ranges) by a voltage reduction detection circuit 126.

Specifically, the voltage reduction detection circuit 126 includes two voltage comparison units, and different thresholds (reference voltages) are set for the voltage comparison units. For example, if the voltage reduction detection circuit 126 includes a first voltage comparison unit 130a and a second voltage comparison unit 136b as shown in FIG. 3, the lower limit (e.g., the order of 1.0 V to 1.5 V) of a voltage at which the oscillation operation of the oscillator 112 is assured is preferably set as a threshold (first threshold) for the first voltage comparison unit 130a and an oscillation stop voltage (e.g., the order of 0.8 V) at which the oscillator 112 stops oscillating is preferably set as a threshold (second threshold) for the second voltage comparison unit 130b.

If it is determined that a voltage inputted into the first voltage comparison unit 130a is lower than the lower limit of the operation-assured voltage, the voltage reduction detection circuit 126 sets an operation-not-assured voltage flag 132a. If it is determined that a voltage inputted into the second voltage comparison unit 130b is lower than the oscillation stop voltage, the voltage reduction detection circuit 126 sets an oscillation stop voltage flag 132b. Therefore, if an inputted voltage is lower than the oscillation stop voltage, the voltage reduction detection circuit 126 sets both the operation-not-assured voltage flag 132a and oscillation stop voltage flag 132b.

Figure 4:
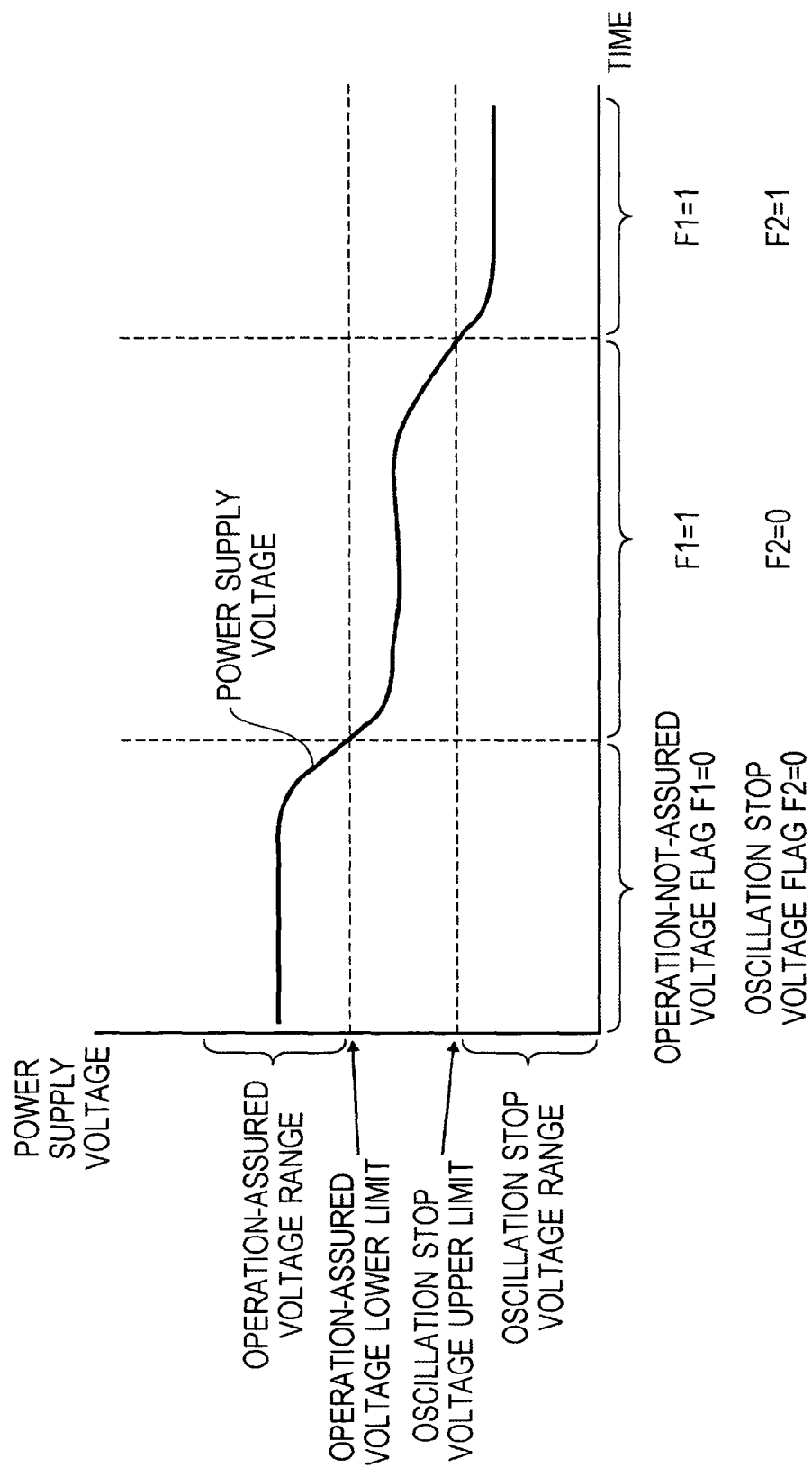
FIG. 4 is a graph showing the flow of flag setting performed due to a reduction in the power supply voltage of the real time clock according to the second embodiment.

Specifically, as shown FIG. 4, if a current inputted to the power supply terminal 128 is inputted to both the first voltage comparison unit 130a and second voltage comparison unit 130b and if the inputted voltage falls within the operation-assured voltage range, the voltage reduction detection circuit 126 sets none of the flags (F1=0, F2=0 in FIG. 4). On the other hand, if the inputted power supply voltage falls below the lower limit of the operation-assured voltage range, it is determined that the inputted voltage falls below the threshold set for the first voltage comparison unit 130a. Therefore, the out-of-operation-assured voltage flag 132a is set (F1 is changed to 1 in FIG. 4). Further, if the inputted voltage falls below the oscillation stop voltage, it is determined that the inputted voltage also falls below the threshold set for the second voltage comparison unit 130b. Therefore, the oscillation stop flag 132b as well as the operation-not-assured voltage flag 132a is set (F2 is changed to 1 in FIG. 4).

As described above, a reduction in the voltage of the inputted current is detected in stages. This allows analyzing the operating state of the real time clock 110 in detail, thus allowing making a more detailed determination about the correctness of information recorded as event data.

Next, a real time clock according to a third embodiment of the invention will be described with reference to FIG. 5. The configuration of the real time clock according to this embodiment is almost the same as those of the above-described real time clocks 10 and 110 according to the first and second embodiments, respectively, Therefore, in FIG. 5, components having the same functions as those in the first and second embodiments are given reference numerals obtained by adding 200 to those in the first and second embodiments and will not be described in detail.

A real time clock 210 according to this embodiment is different from the real time clocks 10 and 110 according to the first and second embodiments, respectively, in that the real time clock 210 includes an oscillation stop detection circuit 250 for determining the oscillation state of an oscillator 212. The oscillation stop detection circuit 250 is a circuit for detecting a signal outputted from an oscillator circuit 216 to a timing circuit 218 and determining whether the oscillator 212 has stopped oscillating, according to the presence or absence of a signal outputted from the oscillator circuit 216.

Therefore, if input of a signal from the oscillator circuit 216 to the oscillation stop detection circuit 250 is interrupted, the oscillation stop detection circuit 250 determines that the oscillator 212 has stopped oscillating, and then sets an oscillation stop detection flag 252 (changes from 0 to 1).

According to the real time clock 210 thus configured, even if the oscillator 212 has stopped oscillating for reasons other than a reduction in the power supply voltage, the user is allowed to detect time-of-day data made incorrect by the oscillation stop and stored as a part of event data. This allows determining the correctness of the recorded data with high accuracy, thus allowing improving the reliability of the recorded data.

Figure 5:
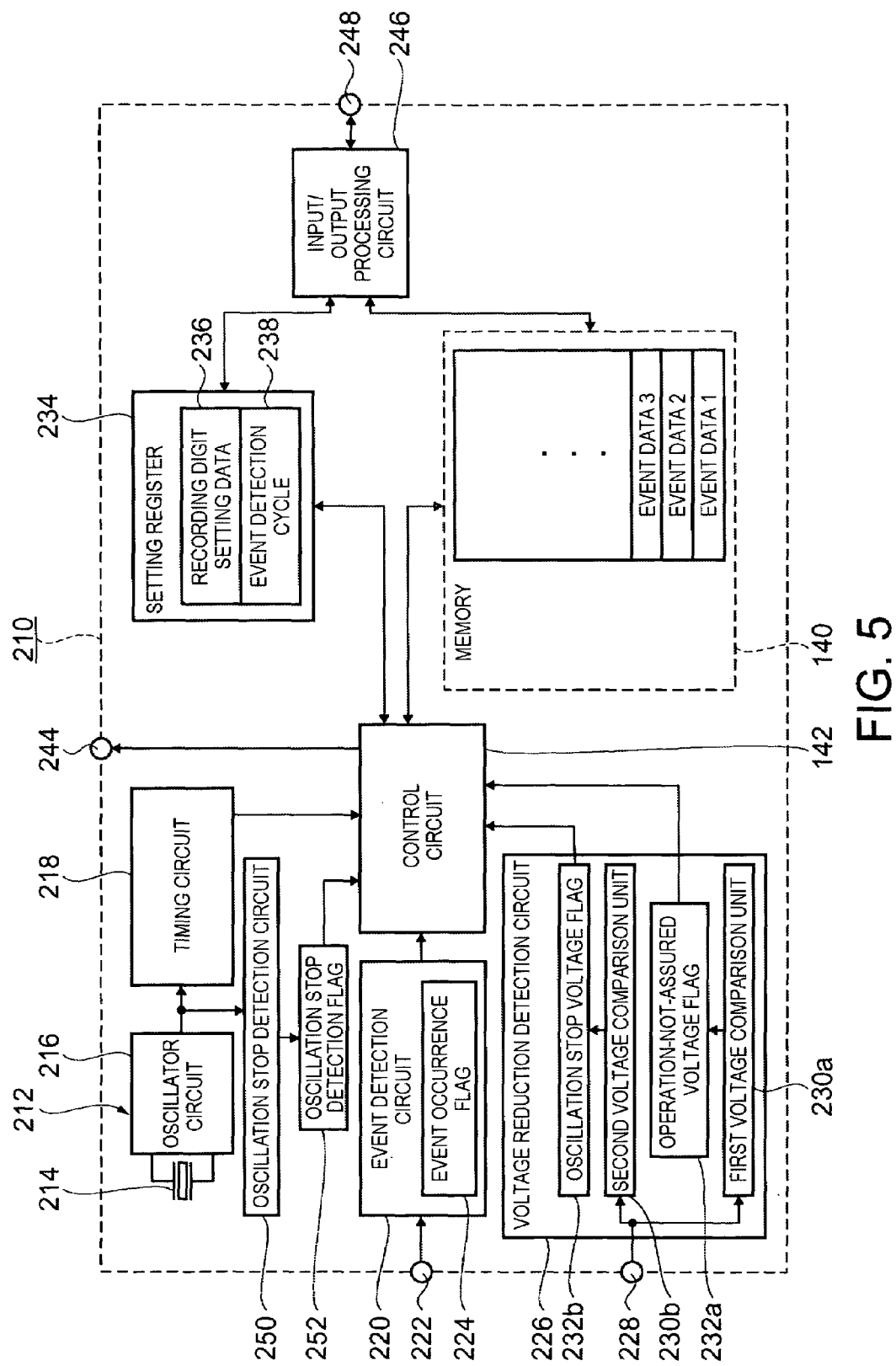
FIG. 5 is a block diagram showing a configuration of a real time clock according to a third embodiment of the invention.

While the oscillation stop detection circuit 250 is shown in FIG. 5 in such a manner that it is additionally provided in the above-described real time clock 110 according to the second embodiment, the oscillation stop detection circuit 250 may be provided in the real time clock 10 according to the first embodiment. Or, the oscillation stop detection circuit 250 may be provided in a real time clock including none of the voltage reduction detection circuits 26, 126, and 226.

In the real time clocks according to the above-described embodiments, the event detection circuit simply sets an event occurrence flag when it detects an electric signal indicating that an event has occurred. However, a real time clock according to the invention may be configured so that the event detection circuit sets an event occurrence flag when detecting the rising edge or falling edge of a pulse of an inputted electric signal and the event occurrence flag thus set may be used as additional data. In this case, it is preferable to record event detection method setting data (indicating whether the rising edge of an electric signal is detected or the falling edge thereof is detected) in the setting register in advance and to, using this data as a command given to the event detection circuit, record data indicating whether the rising edge of an signal has been detected or the falling edge of the signal has been detected, as additional data when recording time-of-day data.

According to such a configuration, information indicating whether the rising edge of an electric signal has been detected or the falling edge thereof has been detected is added to time-of-day data to be recorded. Therefore, even if the contents of the setting register are replaced and the user can no longer read, from the setting register, data indicating whether the recorded time-of-day data is data about the rising edge of the electric signal or data about the falling edge thereof, the user is allowed to know whether the rising edge of the electric signal has been detected or the falling edge thereof has been detected, on the basis of the information added to the recorded time-of-day data. That is, since the setting of the event input terminal is recorded as additional information, the user is allowed to read the setting from the recorded data even if the user does not know the original setting (setting in the setting register).

In the above-described embodiments, a single event input terminal is provided and additional information is added to an electric signal inputted into the event input terminal. In this case, information specific to an event must be previously added to an electric signal itself to be inputted into the event input terminal. However, according to the following configuration, even if electric signals corresponding to different events are of the same type, information specific to each event is added to the corresponding electric signal before the electric signal is outputted to the control circuit. That is, multiple event input terminals are provided and individual event occurrence devices (not shown) are coupled thereto. Then, a port number assigned to each event input terminal is added to an electric signal inputted to each terminal and each port number is outputted as information specific to each event, to the control circuit so that each port number is used as one of data pieces making up the corresponding additional information. A real time clock thus configured is also considered a real time clock according to the invention.

The entire disclosure of Japanese Patent Application Nos: 2007-189145, filed Jul. 20, 2007, 2008-145530, filed Jun. 3, 2008 are expressly incorporated by reference herein.

What is claimed is:

1. A real time clock for outputting data indicating a time-of-day, comprising:
    an event detection circuit for detecting that an event detection signal has been inputted from outside;
    a timing circuit for generating the time-of-day data according to a signal outputted from an oscillator circuit;
    a memory;
    a control circuit for, if the event detection circuit detects input of the event detection signal, recording event data in the memory, the event data including additional data indicating an operating state of the real time clock and the time-of-day data generated by the timing circuit;
    a voltage reduction detection circuit for detecting a reduction in a power supply voltage applied to a power supply terminal, wherein the additional data includes voltage reduction information indicating a reduction in the power supply voltage detected by the voltage reduction detection circuit; and
    a plurality of terminals for receiving the event detection signal, wherein
        if the event detection circuit detects input of the event detection signal, the control circuit records the event data in the memory, the event data including the additional data, the time-of-day data, and a port number of one of the terminals, the one of the terminals having received the event detection signal.

2. The real time clock according to claim 1, wherein the voltage reduction detection circuit includes a first voltage comparison unit for detecting that the power supply voltage is lower than a first threshold, and the voltage reduction information includes information indicating whether, when the event detection circuit detects input of the event detection signal, the first voltage comparison unit of the voltage reduction detection circuit has detected that the power supply voltage is lower than the first threshold.

3. The real time clock according to claim 2, wherein the voltage reduction detection circuit further includes a second voltage comparison unit for detecting that the power supply voltage is lower than a second threshold, the second threshold being set to a value lower than the first threshold, wherein the voltage reduction information includes information indicating whether the second voltage comparison unit of the voltage reduction detection circuit detects that the power supply voltage is lower than the second threshold.

4. The real time clock according to claim 1, further comprising an oscillation stop detection circuit for detecting that the oscillator circuit has stopped oscillating, wherein the additional data includes oscillation stop information indicating whether the oscillation stop detection circuit detects the oscillation stop.

5. The real time clock according to claim 1, further comprising a setting register in which any one of rising edge detection mode and falling edge detection mode is set, the rising edge detection mode detecting a rising edge of a voltage waveform of the event detection signal, and the falling edge detection mode detecting a falling edge of the voltage waveform of the event detection signal, wherein the additional data includes detection information indicating which of the rising edge detection mode and the falling edge detection mode has previously been set in the setting register when the event detection circuit detects input of the event detection signal.

6. A method for recording data in a real time clock having a function of recording data indicating a time of day of occurrence of an event in a memory, the method comprising recording, as event data, data including the time-of-day data and additional data, the additional data including a determination about an operating state of the real time clock at the time of occurrence of the event, wherein the additional data includes information indicating a determination within which, of a plurality of voltage ranges, a voltage applied to the real time clock falls.

7. The method for recording data in a real time clock according to claim 6, wherein the additional data includes information indicating a determination whether a power supply voltage applied to a power supply terminal is lower than a threshold.

8. The method for recording data in a real time clock according to claim 6, wherein the additional data includes information indicating whether a stop of oscillation of an oscillator circuit of the real time clock has been detected.

* * * * *